United States Patent [19]

Wilson

[11] Patent Number: 4,901,800
[45] Date of Patent: Feb. 20, 1990

[54] CULTIVATOR TOOL FOR PLANTING SEEDLINGS

[76] Inventor: Alvin K. Wilson, P.O. Box 162, Elmira, Oreg. 97437

[21] Appl. No.: 216,962

[22] Filed: Jul. 11, 1988

[51] Int. Cl.⁴ .................. A01B 35/28; A01B 23/00
[52] U.S. Cl. ............................... 172/25; 172/111; 111/116; 175/394; 175/388; 366/343
[58] Field of Search ............... 175/394, 388, 385, 406, 175/408; 172/25, 747, 111; 366/343, 318, 322; 111/116

[56] References Cited

U.S. PATENT DOCUMENTS

| | | | |
|---|---|---|---|
| 2,493,261 | 1/1950 | Porter | 175/388 X |
| 2,624,551 | 1/1953 | Garner | 172/47 X |
| 2,709,573 | 5/1955 | Reed | 175/394 |
| 3,023,585 | 3/1962 | Liver | 366/343 |
| 3,092,190 | 6/1963 | Gruere | 175/323 X |
| 3,166,303 | 1/1965 | Chapman | 366/343 |
| 3,175,630 | 3/1965 | Hein | 175/413 X |
| 3,422,915 | 1/1969 | Watts | 175/388 |
| 4,260,267 | 4/1981 | Walton | 366/343 |
| 4,326,592 | 4/1982 | Stephenson | 172/747 |
| 4,494,613 | 1/1985 | Tamaki | 175/417 |

FOREIGN PATENT DOCUMENTS

| | | | |
|---|---|---|---|
| 934612 | 10/1955 | Fed. Rep. of Germany | 111/116 |
| 1027455 | 4/1958 | Fed. Rep. of Germany | 111/116 |
| 1222214 | 4/1986 | U.S.S.R. | 111/116 |

Primary Examiner—Richard J. Johnson
Attorney, Agent, or Firm—James D. Givnan, Jr.

[57] ABSTRACT

The tool includes a shaft adapted at its upper end to receive a power source. Flighting extends partially along the shaft above a pair of radially directed elongate blades which project outwardly from the shaft a distance beyond the flighting edge. A modified form dispenses with the flighting.

5 Claims, 1 Drawing Sheet

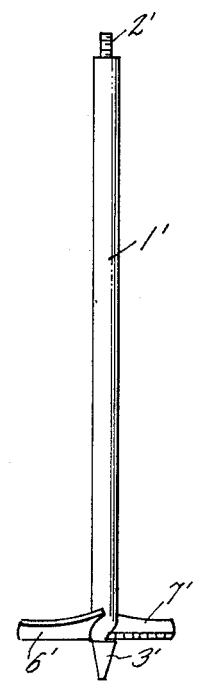
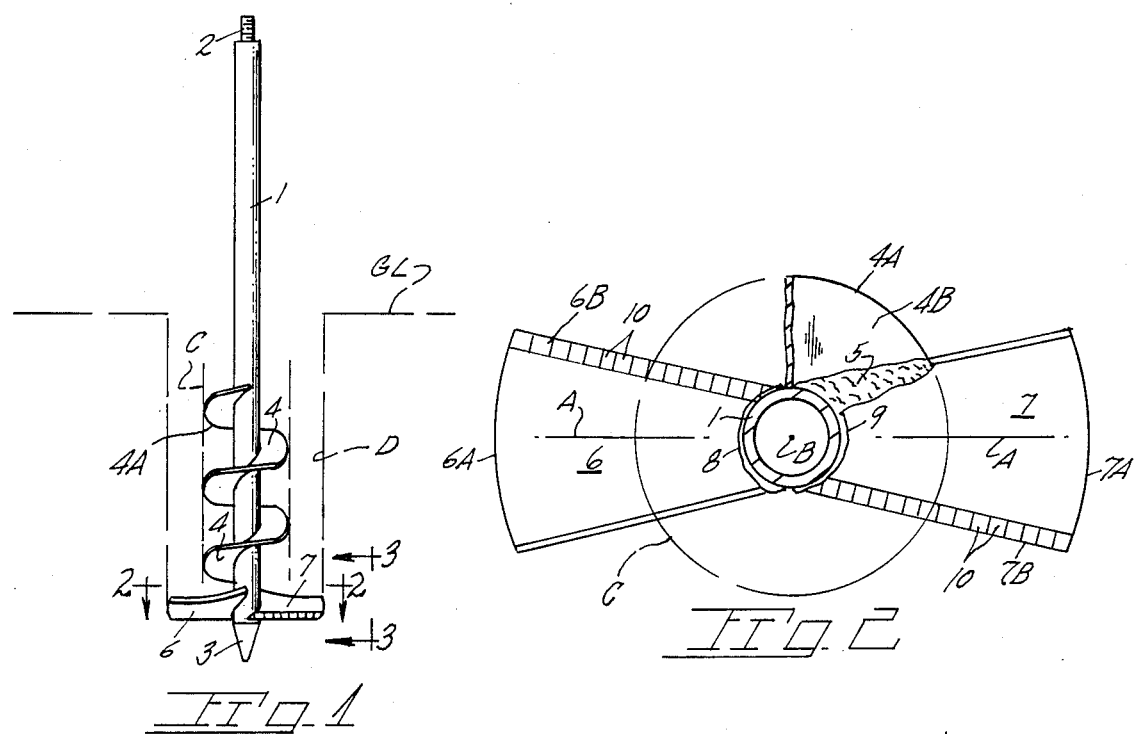
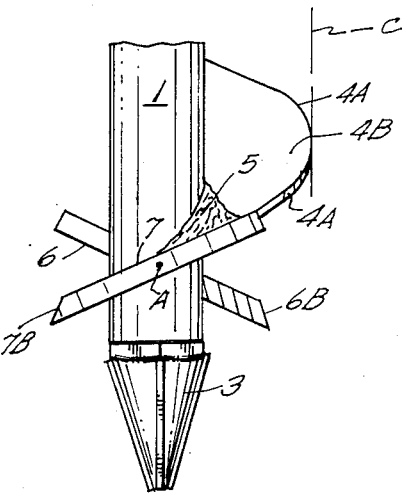

CULTIVATOR TOOL FOR PLANTING SEEDLINGS

BACKGROUND OF THE INVENTION

The present invention pertains generally to tools for preparation of the ground prior to planting.

In the planting of seedlings in a reforestation project, it is common practice to drill a ground hole, plant the seedling and backfill the hole. Obviously a considerable amount of time is spent in the planting of each seedling in view of the several above steps. The diameter of the ground hole is normally quite small and can result in undesired reversal of the tree root when the seedling is planted.

In the prior art, U.S. Pat. No. 3,175,630 discloses an auger having replaceable blades integral with auge flighting and substantially of the same diameter as the flighting. U.S. Pat. No. 3,092,190 discloses an earth boring drill for large tunnels and having a tubular shaft with flighting and with arms carried by the lower end of the shaft which project beyond the flighting diameter. Said arms carry cutters along a circular path outwardly of the flighting. U.S. Pat. No. 4,494,613 discloses an apparatus for driving casing into the ground with the apparatus including a cutter arm of greater length or span than the flighting diameter carried by a shaft of the apparatus.

SUMMARY OF THE PRESENT INVENTION

The present invention is embodied within a cultivator tool which in one operation forms a ground hole and comminutes the earthen material to provide an optimum soil condition for the seedling. Further, use of flighting in the tool additionally agitates the comminuted material to facilitate extraction of the tool. A pair of blades are of elongate shape and project in horizontal fashion beyond a theoretical flighting cylinder to form a ground hole of greater size than could be accomplished with a conventional auger normally powered by a small gasoline engine. The present blades are preferably formed with a helical component. A continuous surface between one of the blades and the flighting is achieved by a fillet.

Important provisions of the present invention include the provision of a cultivator tool which both forms a ground hole and then pulverizes the earthen material dislodged by the hole forming operation to provide an optimum soil condition for a seedling; the provision of a cultivator tool wherein flighting is utilized for the purpose of pulverizing soil dislodged by a pair of blades which extend outwardly beyond helical flighting of the tool to form a ground hole of greater diameter than could ordinarily be formed using a portable, motor driven auger.

BRIEF DESCRIPTION OF THE DRAWINGS

In the accompanying drawings:

FIG. 1 is a side elevational view of the present tool with ground and hole surfaces shown in phantom lines;

FIG. 2 is a horizontal sectional view of the tool taken along line 2—2 of FIG. 1;

FIG. 3 is a side elevational view of the tool taken along line 3—3 of FIG. 1; and FIG. 4 is a view similar to FIG. 1 but showing a modified form of the tool.

DETAILED DESCRIPTION OF THE PREFERRED EMBODIMENTS

With continuing attention to the drawings wherein applied reference numerals indicate parts similarly hereinafter identified, the reference numeral 1 indicates the tubular shaft of the present cultivator tool adapted for attachment at 2 to a power source not shown. A removable auger point is at 3 which may be provided with a threaded stud (not shown) for removable attachment to the shaft lower end.

Helical flighting or mixing blade means 4 extends at least partially along shaft 1 and has an outer edge 4A. An inner edge of the flighting is welded to shaft in a helical manner. A lower end segment 4B of the flighting terminates at a fillet 5 which serves to merge the upper surface of flighting lower end segment 4B with the upper surface of one of the following described blades.

Elongate blades at 6 and 7 are secured as by welds 8 and 9 to the lower end segment of shaft 1. The blades preferably have a helical component. Blade outer distal edges at 6A–7A are outwardly offset beyond a hypothetical cylinder C containing flighting edge 4A. The axis A of each blade is normal to a shaft axis at B. Blade leading edges are at 6B and 7B and may be of carbide material 10 soldered to the blade for wear resistance.

In use, the blades 6 and 7 are effective to clear the ground of vegetation, termed scalping, by those involved in tree planting. The blades, when powered manually or by an engine, draw the tool into the ground. The flighting 4 breaks up clumps of earthen material to comminute the soil dislodged by the blades. The finely cultivated soil provides an optimum soil environment for a seedling. In the planting of seedlings in unprepared areas, such as in a reforestation project, it is highly advantageous to provide a sizable area at D of cultivated soil about the seedling.

The flighting terminates upwardly at a vertical distance below the ground line at GL to prevent expulsion of the soil by the flighting.

A satisfactory tool utilizes four inch diameter flighting and blades having a span of eight inches from outer edge to outer edge. At the termination of downward travel, the tool is lifted from the ground hole with the shaft rotating to cause the soil to spill off the flighting and remain in the ground hole. The modified tool shown in FIG. 4 is for use in shallow plantings of a foot or so in depth where the soil is readily pulverized by the blades 6' and 7' and where tool removal effort is of little consequence in view of the small quantity of soil resting on the blades.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

I claim:

1. A cultivating tool comprising in combination,
    a shaft having mixing blade means thereon and adapted to be rotated,
    elongate radically projecting digging blades below said mixing blade means and having inner ends secured to the shaft below said mixing blade means and adjacent a ground penetrating end of said shaft,
    each of said digging blades having a distal outer end, means securing each of said digging blades to said shaft, and said digging blades each having an upper surface and a horizontal major axis and being of a length so as to dispose the digging blade outer ends radically outwardly from a cylindrical projection containing the outer extremities of the mixing blade means, said digging blades having a span between their distal outer ends substantially twice the diameter of said mixing blade means, said mixing blade means serving to cultivate earthen material above said digging blades.

2. The tool claimed in claim 1 wherein said digging blades have a helical component.

3. The tool claimed in claim 1 including a fillet merging the upper surfaces of one of said digging blades with said mixing blade means.

4. The tool claimed in claim 1 wherein said digging blades have leading edges, wear resistant material in place along each of said leading edges.

5. The tool claimed in claim 1 wherein said mixing blade means have a helical component.

* * * * *